(12) United States Patent
Hall et al.

(10) Patent No.: US 8,632,047 B2
(45) Date of Patent: Jan. 21, 2014

(54) SHEAR BLADE GEOMETRY AND METHOD

(75) Inventors: Christopher Andrew Hall, Cypress, TX (US); Seemant Yadav, Houston, TX (US); Robert Arnold Judge, Houston, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 170 days.

(21) Appl. No.: 13/019,421

(22) Filed: Feb. 2, 2011

(65) Prior Publication Data

US 2012/0193087 A1 Aug. 2, 2012

(51) Int. Cl.
*E21B 33/06* (2006.01)

(52) U.S. Cl.
USPC .............................. 251/1.3; 251/1.1; 166/363

(58) Field of Classification Search
USPC ............. 251/1.1, 1.2, 1.3; 166/85.4, 363, 364
See application file for complete search history.

(56) References Cited

U.S. PATENT DOCUMENTS

| | | | | |
|---|---|---|---|---|
| 1,587,838 A * | 6/1926 | Houk | | 166/95.1 |
| 2,512,744 A * | 6/1950 | Hill | | 251/1.3 |
| 2,620,030 A * | 12/1952 | Anderson | | 83/694 |
| 2,832,134 A * | 4/1958 | Lukan | | 30/443 |
| 3,318,573 A | 5/1967 | Matsuki et al. | | |
| 3,399,728 A * | 9/1968 | Taylor | | 166/53 |
| 3,561,526 A * | 2/1971 | Williams et al. | | 166/55 |
| 3,692,316 A * | 9/1972 | Bishop et al. | | 277/325 |
| 3,736,982 A * | 6/1973 | Vujasinovic | | 166/55 |
| 4,055,100 A * | 10/1977 | Borzym | | 83/454 |
| 4,132,265 A * | 1/1979 | Williams, Jr. | | 166/55 |
| 4,341,264 A * | 7/1982 | Cox et al. | | 166/55 |
| 4,355,957 A | 10/1982 | Sifford et al. | | |
| 4,646,825 A * | 3/1987 | Van Winkle | | 166/55 |
| 4,845,849 A * | 7/1989 | Aubriot | | 30/92 |
| 5,064,164 A * | 11/1991 | Le | | 251/1.1 |
| 5,388,962 A | 2/1995 | Wygle et al. | | |
| 7,207,382 B2 | 4/2007 | Schaeper | | |
| 7,243,713 B2 | 7/2007 | Isaacks et al. | | |
| 7,367,396 B2 | 5/2008 | Springett | | |
| 7,814,979 B2 | 10/2010 | Springett et al. | | |
| 8,066,070 B2 | 11/2011 | Springett et al. | | |
| 2004/0062643 A1 | 4/2004 | Brauer et al. | | |
| 2007/0258816 A1 | 11/2007 | Bouchard et al. | | |
| 2008/0286534 A1* | 11/2008 | Springett et al. | | 428/192 |

FOREIGN PATENT DOCUMENTS

| | | |
|---|---|---|
| GB | 2148404 A | 5/1985 |
| GB | 2262139 | 9/1993 |
| JP | H1162502 A | 3/1999 |
| WO | WO99/50534 | 10/1999 |

* cited by examiner

*Primary Examiner* — John K Fristoe, Jr.
*Assistant Examiner* — Umashankar Venkatesan
(74) *Attorney, Agent, or Firm* — Bracewell & Giuliani LLP

(57) ABSTRACT

A pair of shear blades and a blowout preventer having the pair of shear blades. The shear blades are configured to cut a tubular inside the blowout preventer. The shear blades have different geometries of the front cutting surfaces. One geometry promotes a secure positioning of the tubular relative to the first blade while the second geometry promotes a puncturing of the tubular by the second blade.

13 Claims, 10 Drawing Sheets

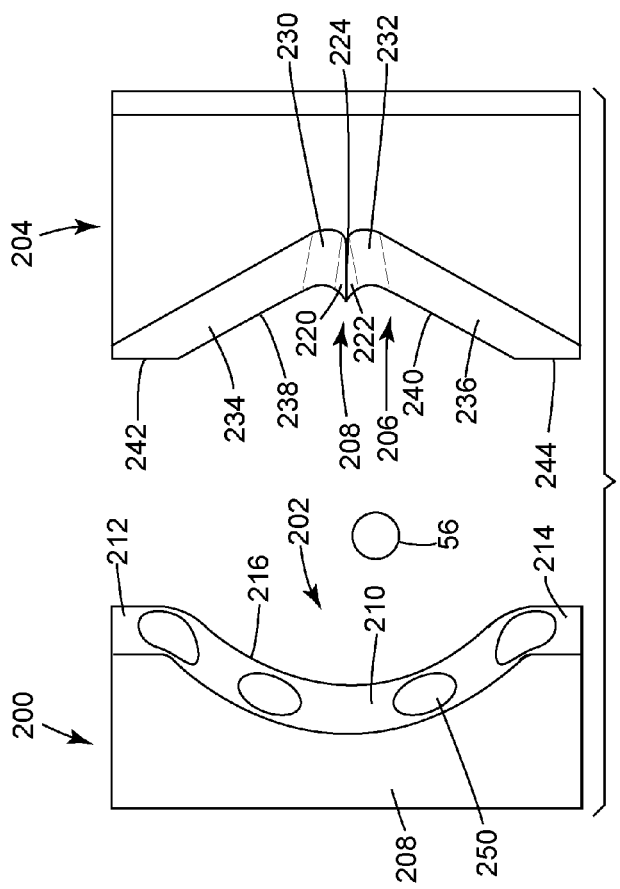
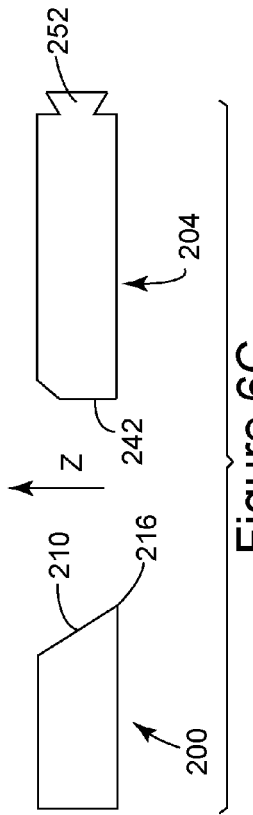
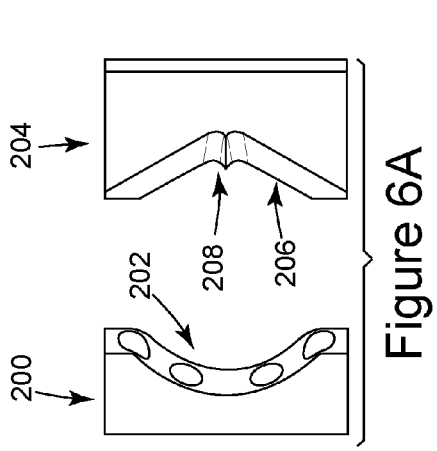
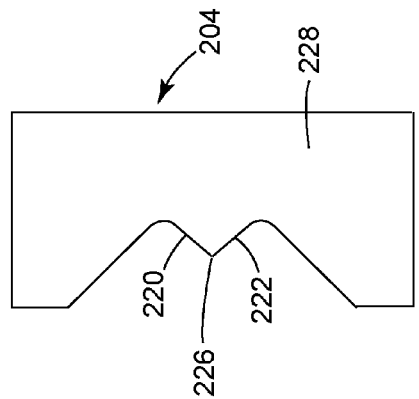
Figure 6A
Figure 6B
Figure 6C
Figure 6D

SHEAR BLADE GEOMETRY AND METHOD

BACKGROUND

1. Technical Field

Embodiments of the subject matter disclosed herein generally relate to methods and systems and, more particularly, to designs of shear blades that more securely shear a tubular.

2. Discussion of the Background

During the past years, with the increase in price of fossil fuels, the interest in developing new production fields has dramatically increased. At the same time, the equipment for extracting the oil is undergoing continuous changes for becoming more effective and reliable. A ram blowout preventer (BOP) is used in most wells for ensuring that the wells are closed in the event that a high pressure develops inside the wells or when various tests are conducted or when equipment above the BOP needs to be replaced or removed. Thus, the BOP is configured to act as a valve. Shear BOP are configured to not only close the well but also cut any tubular or tools that may be present inside the well.

For example, it may happen that during drilling, while the drill string is inside the well, a high pressure pocket is intersected by the drill. In this case, the shear ram BOP is used to cut the drill string to seal the well to prevent the high pressure from propagating to the rig above for safety reasons. The shear ram BOP traditionally includes two blades that move towards each other for shearing the tubular. However, there are instances when the existing blades are not capable of shearing the tubular or tools inside the well, thus failing to seal the well. This failure to shear the tubular may result in catastrophic events that may destroy the rig and may result in loss of human lives. For a better understanding of how the blades shear the tubular, a BOP is discussed next.

A shear ram BOP is shown in FIG. 1. A BOP 16 is shown having ram blocks 20. The ram blocks 20 are configured to move, when actuated by a rod 22, inside a first elongated cavity 24. The first elongated cavity 24 extends along a first axis X. A second elongated cavity 26 extends along axis Y, substantially perpendicular to and intersecting the first elongated cavity 24. The ram block 20 may include a shear blade 28 that is configured to cut a tubular 30 that may be present inside a well 32. The shear blade 28 may have a sharp edge that effectively cuts tool 30 when necessary. Another similar shear block and shear blade may be provided in an opposite region of the first elongated cavity 24.

A more detailed view of the ram block 20 and the shear blade 28 is shown in FIG. 2. The shear blade 28 is shown detached from the ram block 20. To attach the shear blade 28 to the ram block 20, a plurality of screws 36 are used. Corresponding holes 38 are formed in a frontal face 40 of the ram block 20. The sharp edge 42 of the shear blade 28 is configured to shear the tool. The thicker the tools provided inside well 32, the more powerful ram blocks 20 and blades 28 need to be provided to resist to the high pressures present inside the BOP when cutting the tool. Such pressure may be between 2,000 and 25,000 psi.

A top view of a pair of conventional shear blades 28 is shown in FIG. 3. It is noted that the two blades 28 are symmetrical and have two cutting edges 44 and 46 that make a large angle $\alpha$ between 120° and 180°. These edges may determine the tubular to move to a central position. However, these cutting edges may fail to shear the tubular if the walls of the tubular are strong or the size of the tubular is larger than a certain value.

Accordingly, it would be desirable to provide systems and methods that avoid the afore-described problems and drawbacks.

SUMMARY

According to one exemplary embodiment, there is a pair of shear blades to be provided in a ram blowout preventer for cutting a tubular. The pair of shear blades includes a first blade having two cutting edges that form an acute angle with each other and a curved cutting edge connecting the two cutting edges; and a second blade having two cutting edges that form an obtuse angle with each other.

According to another exemplary embodiment, there is a shear ram blowout preventer (BOP) that includes a body having a first elongated cavity extending along a first axis and a second elongated cavity extending perpendicular to and intersecting the first elongated cavity; a pair of ram blocks provided in the first elongated cavity and configured to slide along the first axis, wherein the ram blocks have frontal faces facing each other and the frontal faces are configured to slide towards the second elongated cavity; and the pair of shear blades discussed in the previous paragraph.

According to still another exemplary embodiment, there is a pair of shear blades to be provided in a ram blowout preventer for cutting a tubular. The pair of shear blades includes a first blade having two cutting edges that form an acute angle with each other and a curved cutting edge connecting the two cutting edges; and a second blade having a front face having a W-shape. The first blade and the second blade are configured to slide one over the other for cutting the tubular.

According to another exemplary embodiment, there is a shear ram blowout preventer that have the pair of shear blades of the previous paragraph.

According to still another exemplary embodiment, there is a pair of shear blades to be provided in a ram blowout preventer for cutting a tubular. The pair of shear blades includes a first blade having a front face configured to cut the tubular, the front face being curved; and a second blade having a front face and a projection portion, the front face being configured to cut the tubular and the projection portion being configured to puncture the tubular.

According to another exemplary embodiment, there is a shear ram blowout preventer that have the pair of shear blades of the previous paragraph.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 6A-D are schematic diagrams of a pair of shear blades according to still another exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of shear ram BOP systems. However, the embodiments to be discussed next are not limited to these systems, but may be applied to other systems that require cutting a tool.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a pair of shear blades to be used in a shear BOP are different from each other. A first blade of the pair has a shape that promotes a movement of the tubular towards a central location, and a second blade has a projection portion that is configured to pierce the tubular while secured at the central location of the first blade. Thus, the two blades work in tandem, one positioning the tubular at a desired position and the other one puncturing the tubular. Cutting the tubular is achieved by cutting edges of both blades. It is noted that the term "shear" used in the exemplary embodiments is not limited to two blades that cut while overlapping each other. This term is understood also to cover the situation when the blades press the tubular between them and the blades do not overlap with each other.

Figure 1:
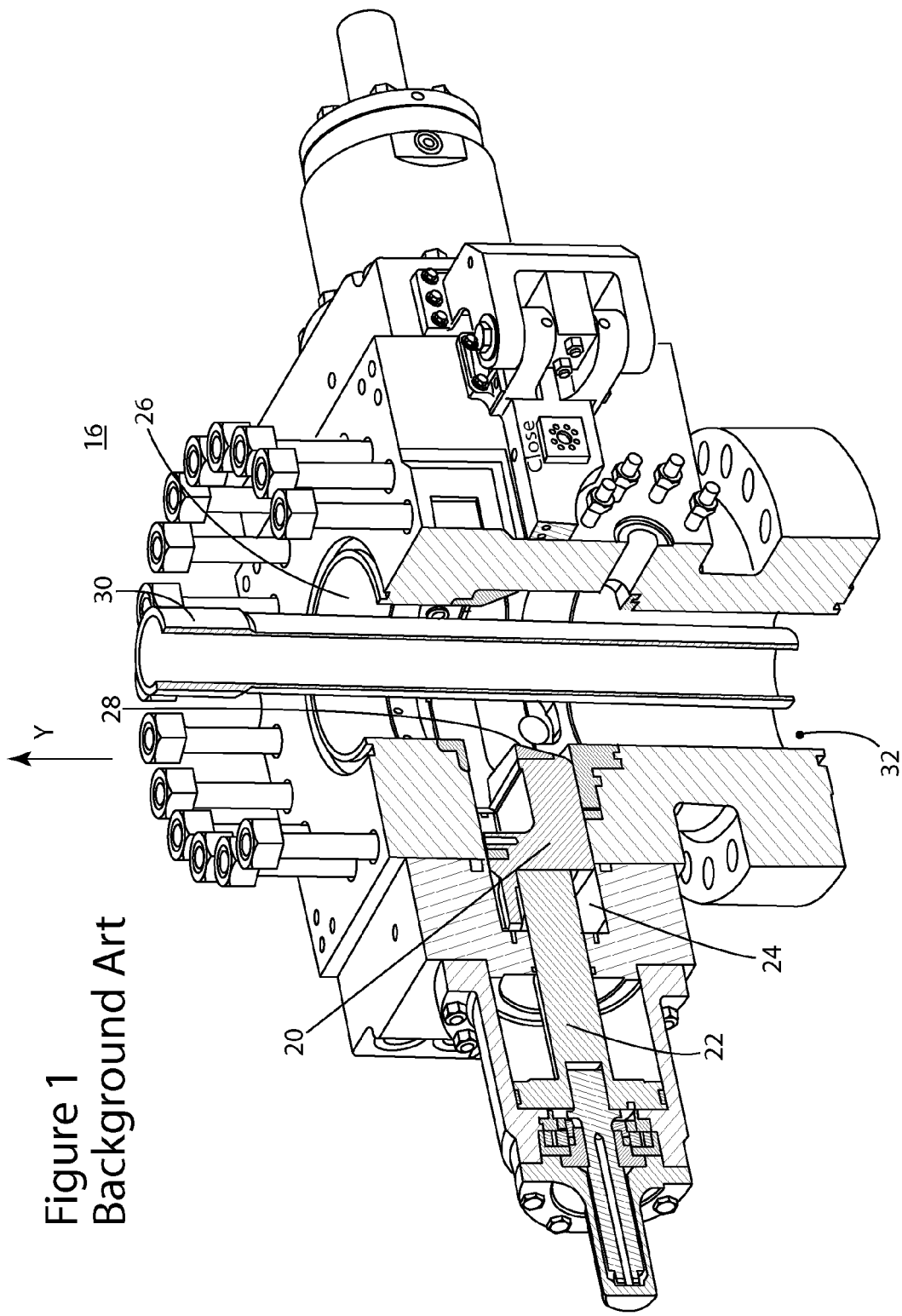
FIG. 1 is a schematic diagram of a conventional blowout preventer.
Figure 2:
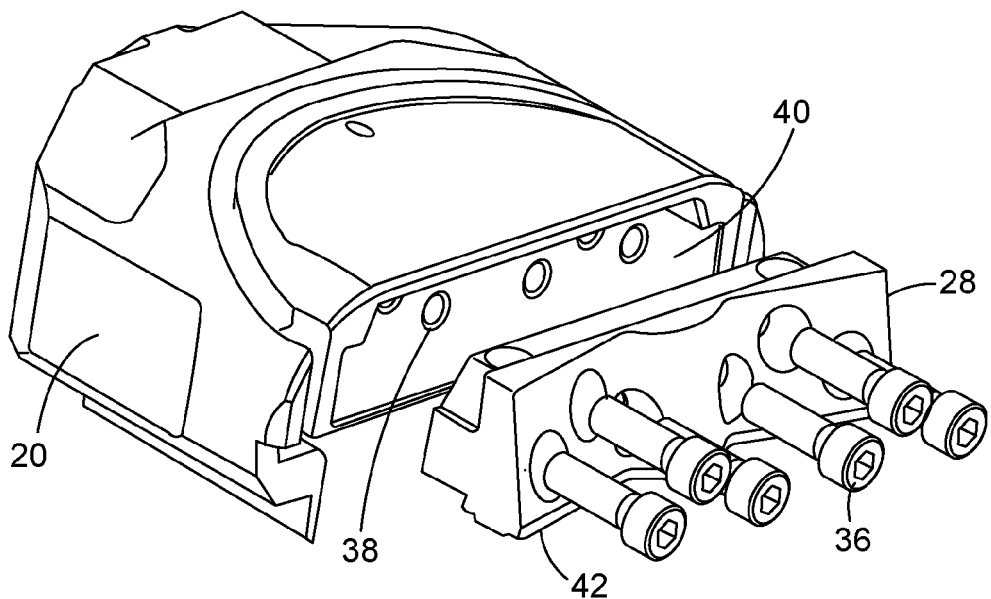
FIG. 2 is a schematic diagram of a shear block and a shear blade of a conventional blowout preventer.
Figure 3:
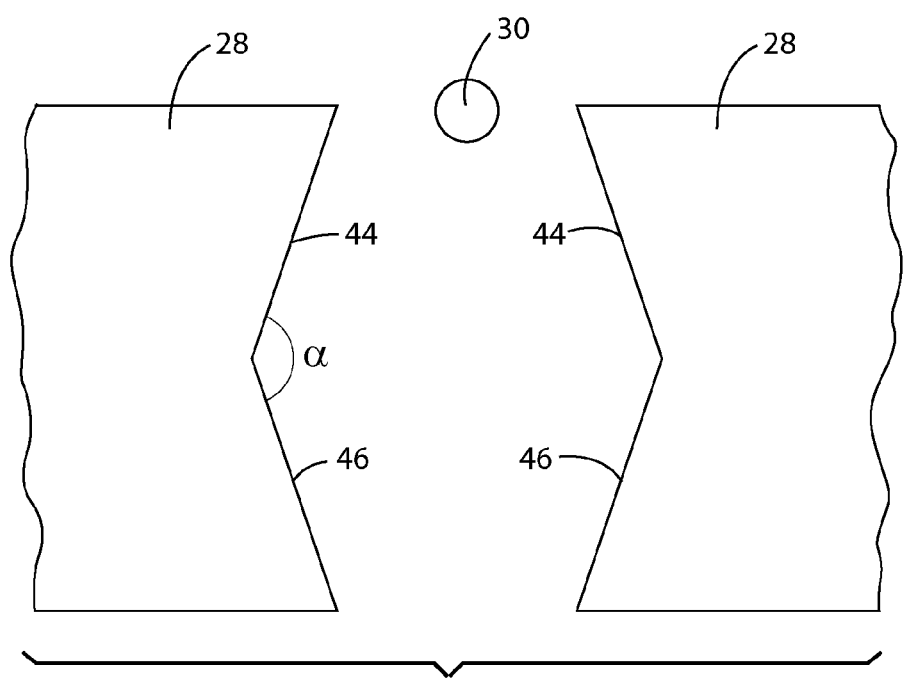
FIG. 3 is a schematic diagram of a pair of conventional shear blades for a blowout preventer.
Figure 4A:
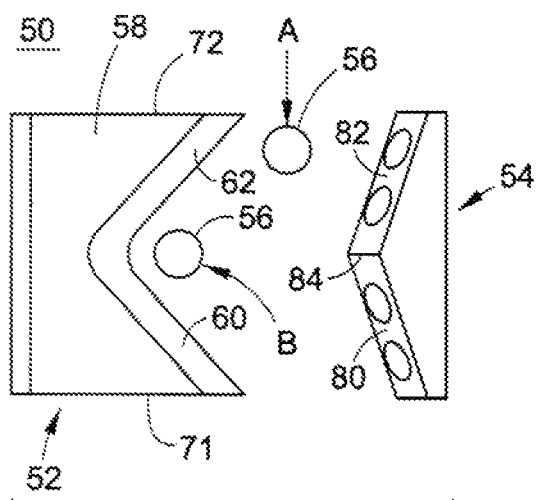
FIGS. 4A-E are schematic diagrams of a pair of shear blades according to an exemplary embodiment, with FIG. 4C being a partial sectional view of FIG. 4B along the line 4C-4C of FIG. 4B.
Figure 4D:
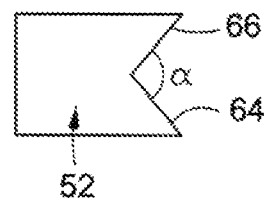
Figure 4E:
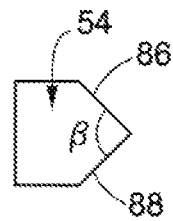
Figure 4B:
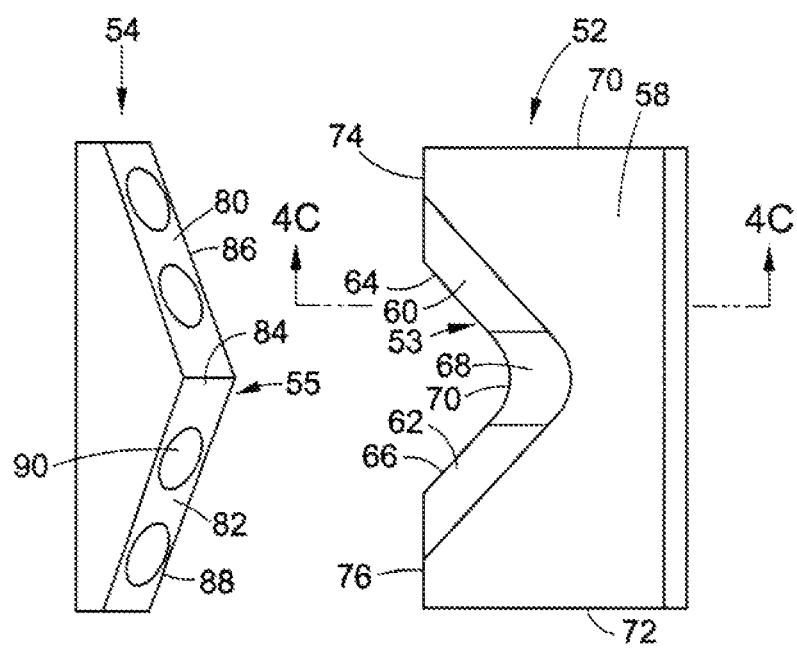
Figure 4C:
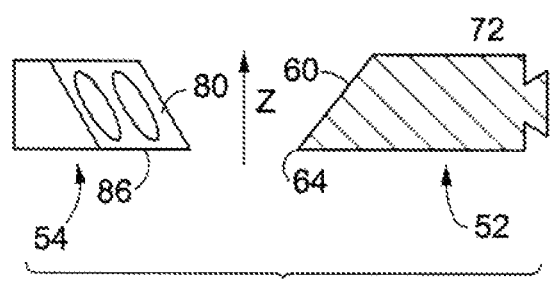

According to an exemplary embodiment illustrated in FIGS. 4A-E, a pair of blades 50 includes a first blade 52 and a second blade 54. The first blade 52 has a V shape that promotes the movement of a tubular 56 from position A to position B when cutting the tubular 56. The first blade 52 has a top face 58, a front face 53 that includes two cutting faces 60 and 62, cutting edges 64 and 66 and a central face 68. The central face 68 connects to the cutting faces 60 and 62 and they together form the face 53 facing the tubular of the first blade. The central face 68 may be curved, as shown in FIG. 4B and has its own cutting edge 70. As shown in FIG. 4C, the cutting surfaces 60 and 62 and/or the central face 68 may be slanted relative to a vertical axis Z.

The first blade 52 is designed to have the cutting edges 64 and 66 at an angle α (see FIG. 4D) between 80° and 120° (to form a V-shape) so that the tubular 56 moves towards the central face 68 when acted upon by both blades 52 and 54. The first blade 52 may be designed such that the cutting faces 60 and 62 intersect edges 71 and 72 of the blade as in FIG. 4A or to have supplemental front faces 74 and 76 as shown in FIG. 4B. Faces 74 and 76 may be slanted or parallel to axis Z and they also may have or not cutting edges.

The profile of the second blade 54 is different from the first blade 52. For example, the second blade 54 has a front face 55 having two front cutting faces 80 and 82 that intersect each other at an edge 84. Each front cutting face 80 and 82 have corresponding cutting edges 86 and 88. An angle β (see FIG. 4E) between the cutting edges 86 and 88 may be different from angle α. Angle β may have a value of about 60°. The front cutting faces 80 and 82 may be slanted relative to axis Z as shown in FIG. 4C. The slant of the front cutting faces 80 and 82 and the cutting surfaces 60 and 62 may be between 13 and 30°. FIG. 4B shows holes 90 in the front cutting faces 80 and 82. These holes are configured to accommodate bolts that attach the shear blade to the shear ram block. However, the holes 90 are not necessary as other means for attaching the blades to the ram blocks are known in the art.

Figure 5A:
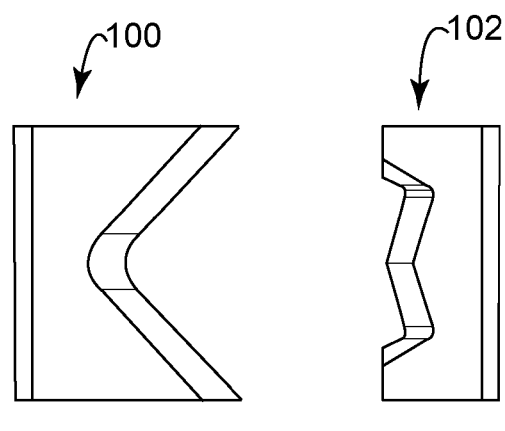
FIGS. 5A-C are schematic diagrams of a pair of shear blades according to another exemplary embodiment.
Figure 5B:
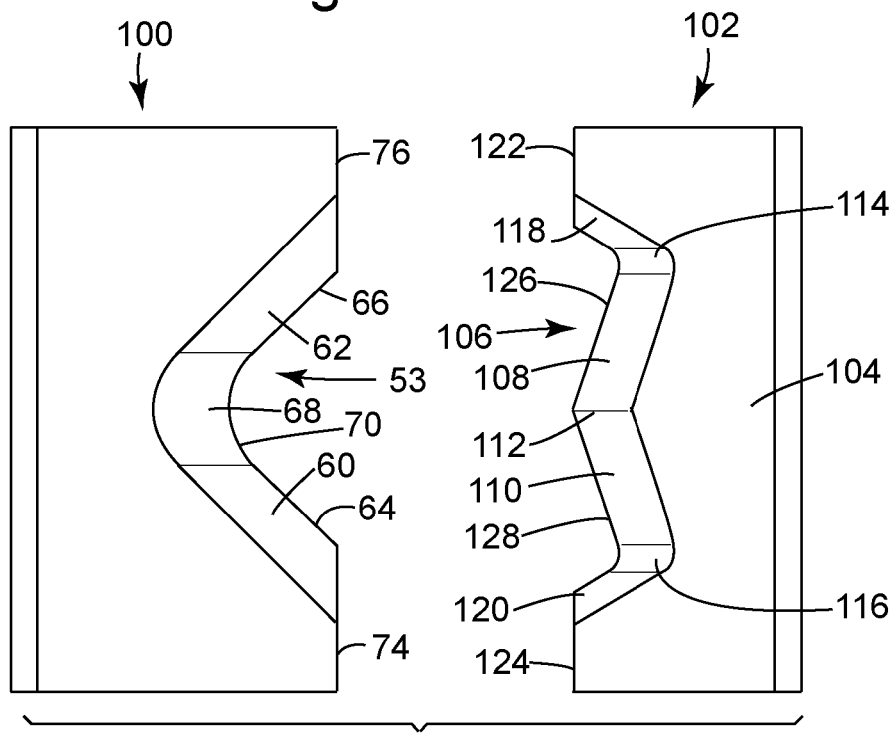
Figure 5C:
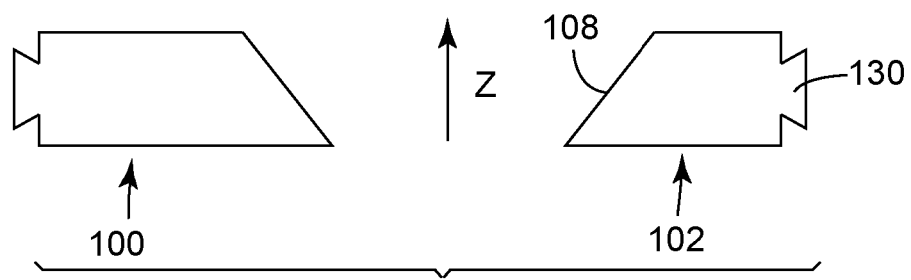

In another exemplary embodiment illustrated in FIGS. 5A-C, a first blade 100 is similar to blade 52 previously discussed. Thus, the details of blade 100 are not further discussed here. A second blade 102 has multiple cutting faces as discussed next. According to this exemplary embodiment, the second blade 102 has a cutting edge that resembles a W-shape. As shown in FIG. 5B, the second blade 102 has a top surface 104 and a front surface 106. The front surface 106 includes first and second cutting surfaces 108 and 110 that intersect each other at an edge 112. The first cutting surface 108 continues with a first curved cutting surface 114 and the second cutting surface 110 continues with a second curved cutting surface 116. The first curved cutting surface 114 continues with a third cutting surface 118 and the second curved cutting surface 116 continues with a fourth cutting surface 120. The first to fourth cutting surfaces 108, 110, 118 and 120 may be flat surfaces. Finally, the third cutting surface 118 continues with a fifth surface 122 and the fourth cutting surface 120 continues with a sixth surface 124.

In one application, the fifth and sixth surfaces 122 and 124 are not cutting surfaces. Further, the fifth and sixth surfaces 122 and 124 extend in a plane that includes axis Z while the first to fourth cutting surfaces may be slanted relative to the Z axis as shown in FIG. 5C. Each cutting surface has a corresponding cutting edge. FIG. 5B shows for simplicity only the cutting edges 126 and 128 of the first and second cutting surfaces 108 and 110.

FIG. 5C shows a projection 130 of the second blade 102 (blade 100 may have a similar projection) that is configured to enter into a corresponding groove in the ram block for attaching the blade to the ram block. Thus, in this embodiment there is no need to have holes in the blades and bolts to attach the blades to the ram blocks.

According to another exemplary embodiment illustrated in FIGS. 6A-C, a first blade 200 has a front cutting surface 202 and a second blade 204 has a front cutting surface 206 that has a projection 208 in a central region of the blade. More specifically, as shown in FIG. 6B, the first blade 200 has a top face 208 and the front cutting surface 202. The front cutting surface 202 includes a curved cutting face 210 and front flat cutting surfaces 212 and 214. Each cutting surface has a corresponding cutting edge 216. While the curved cutting face 210 may be slanted relative to axis Z as shown in FIG. 6C, the front flat cutting surface 212 and 214 are parallel to axis Z.

The second blade 204 has the central projection 208 including flat cutting surfaces 220 and 222 that intersect each other at edge 224. The flat cutting surfaces 220 and 222 may be slanted to axis Z. The edge 224 is also slanted to axis Z and has a most projected point 226 as shown in FIG. 6D, which shows a back face 228 of the second blade 204. Flat cutting surfaces 220 and 222 of the projection 208 continue with first and second cutting surfaces 230 and 232 of the cutting surface 206. The cutting surfaces 230 and 232 are slanted to axis Z and curved. They continue with third and fourth cutting surfaces 234 and 236 which have cutting edges 238 and 240. Cutting surfaces 220, 222, 230 and 232 may also have cutting edges but are not referenced for simplicity. However, in one application, these cutting surfaces do not have cutting edges.

Third and fourth cutting surfaces 234 and 236 continue with fifth and sixth surfaces 242 and 244. These surfaces may be non-cutting surfaces and may be parallel to the Z axis. These surfaces may be designed to match surfaces 212 and 214 of the first blade 200. The most projected point 226 of the second blade 204 may be in fact a small surface. However, surface or point, the most projected point 226 is configured to pierce a tubular 56 positioned between blades 200 and 204 and cutting edges 216, 238, and 240 are configure to completely cut the tubular. FIG. 6B shows holes 250 in the first blade 200 for attaching this blade to the corresponding ram block while FIG. 6C shows a projection 252 of the second blade 204 to be slided in a corresponding groove in the corresponding ram block. Other mechanisms for attaching the blades to the ram blocks may be used.

Figure 7A:
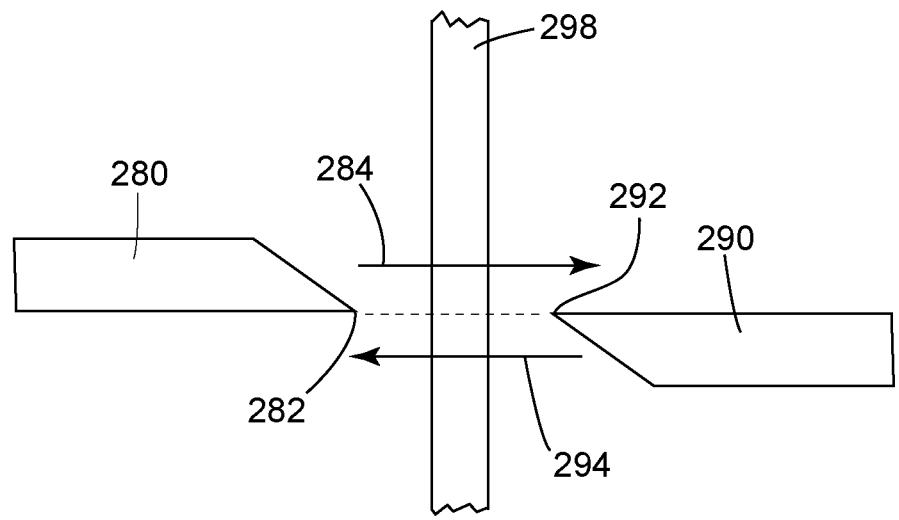
FIGS. 7A-B schematically illustrate how the pair of shear blades shear a tubular according to an exemplary embodiment.
Figure 7B:
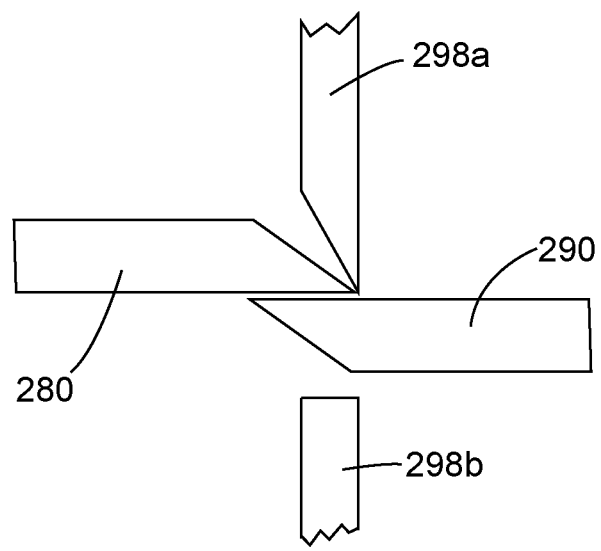

The embodiments shown in FIGS. 4A to 6D share the following feature illustrated in FIG. 7A. Considering generic blades 280 and 290 having respective cutting edges 282 and 292, and considering a tubular 298 provided between the two blades, it is noted that blade 280 moves along line 284 and blade 290 moves along line 294, which are substantially parallel but not the same. Further, it is noted that when shearing the tubular, the blade 280 overlaps blade 290 as shown in FIG. 7B, and the upper part 298a of the tubular has been severed from the lower part 298b of the tubular 298.

Figure 8B:
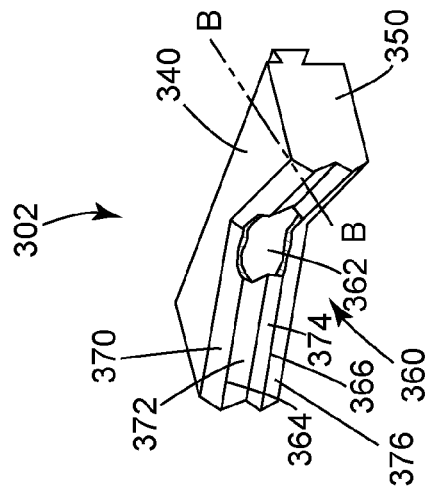
FIGS. 8A-F are schematic diagrams of a pair of shear blades according to yet another exemplary embodiment.
Figure 8A:
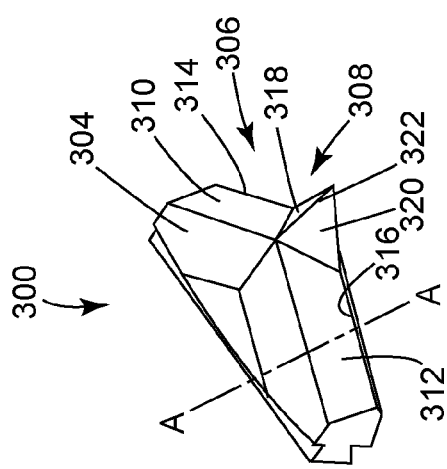
Figure 8D:
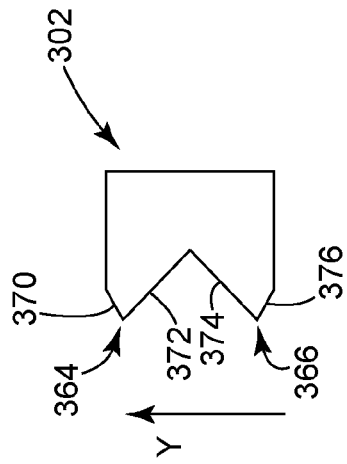
Figure 8C:
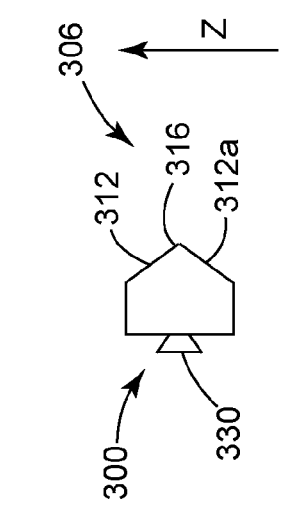

According to another exemplary illustrated in FIGS. 8A-8C, a first blade 300 has a cutting edge and a second blade 302 has a dual cutting edge configured to receive the cutting edge of the first blade. More specifically, as shown in FIG. 8A, the first blade 300 has a top surface 304 and a front face 306. A projection portion 308 extends from a central portion of the front face 306 and this projection portion is designed to pierce the tubular. The front face 306 has an upper portion (seen in FIG. 8A) and a lower portion (not seen in FIG. 8A), each having first and second cutting faces. For simplicity, only the upper portion of the front face 306 is described next. The upper portion has a first cutting face 310 and a second cutting face 312, each having a cutting edge 314 and 316, respectively. Symmetrical faces (shown in FIG. 8F) are provided on the lower part. In one application, the faces on the lower part are not identical to the faces on the upper part. The lower part includes mirror face 310a, symmetrical to face 310 and mirror face 312a symmetrical to face 312. The intersection of faces 310 and 310a forms the cutting edge 314 and the intersection of faces 312 and face 312a forms the cutting edge 316. The projection portion 308 has a first cutting face 318 and a second cutting face 320 that intersect each other at an edge 322. The first and second cutting faces 318 and 320 have their own cutting edges.

Figure 8E:
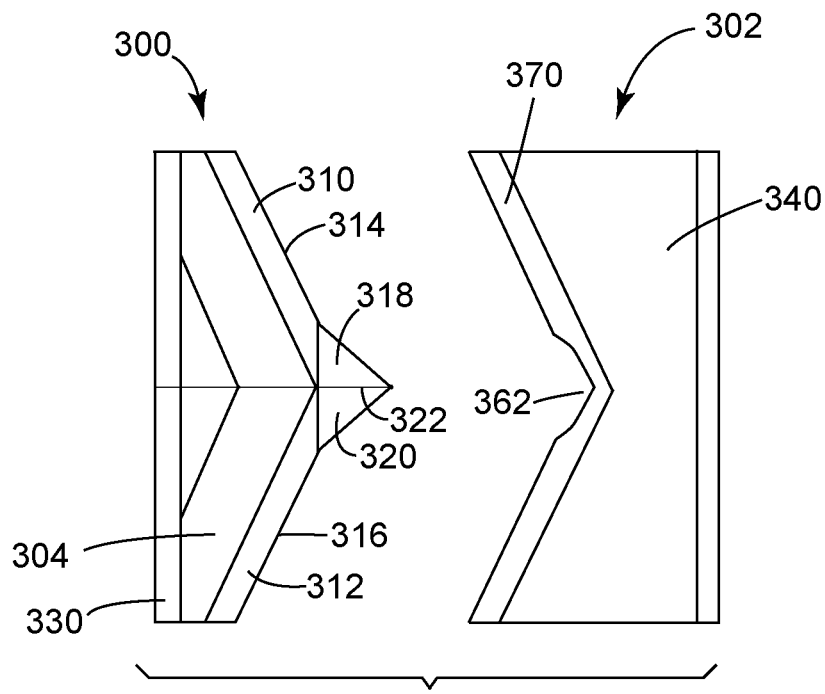
Figure 8F:
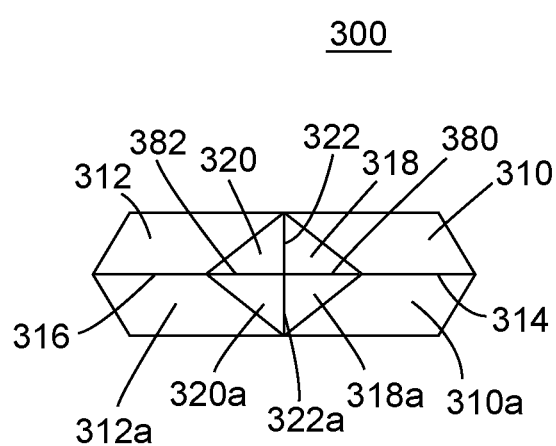

A cross section along line A-A in FIG. 8A of the front face 306 is shown in FIG. 8C. In this figure it is visible the second cutting face 312 on the upper part and its symmetrical mirror face 312a on the lower part of the front face 306. The same is true for faces 310, 318, and 320 as shown in FIG. 8F. A top view of the first blade 300 is shown in FIG. 8E. It is noted that faces 310, 312, 318, and 320 are slanted relative to a vertical axis Y as shown in FIG. 8C. Further, FIG. 8C shows a projection 330 on the back face of the first blade 300 and this projection is configured to slide into a groove in the ram block for securing the blade to the ram block.

The second blade 302 is illustrated in FIGS. 8B, D and E. It is noted that this blade has a top face 340, side faces 350 and a front cutting face 360. The front cutting face 360 has a V-shape. The V-shape is made by two edges on each arm and a cavity 362 in a central region for accommodating the projection portion 308 of the first blade 300. The front cutting face 360 includes on each side of the V-shape an upper cutting edge 364 and a lower cutting edge 366. The cutting edges 364 and 366 are spaced to receive the cutting edges 314 and 316 of the first blade 300. A profile of the second blade 302 along line B-B in FIG. 8B is shown in FIG. 8D. It is noted four cutting faces 370, 372, 374, and 376 that intersect in pairs at the cutting edges 314 and 316.

To place in perspective the profile of the first blade 300, FIG. 8F shows the first blade 300 from a front view so that the first cutting face 310 and second cutting face 312 are shown forming the upper part of the blade and the mirror first and second cutting faces 310a and 312a form the lower part of the blade. The projection portion 308 is shown having the upper first and second projection faces 318 and 320 and the lower first and second mirror projection faces 318a and 320a. The corresponding edges 380 and 382 are also shown.

Figure 9:
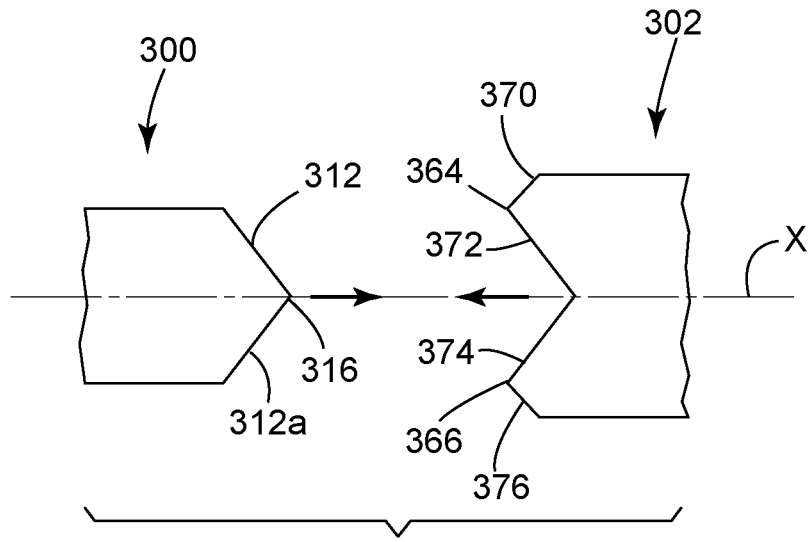
FIG. 9 schematically illustrates how the pair of shear blades of FIGS. 8A-F shear a tubular according to an exemplary embodiment.

Different from the previously discussed embodiments, the first and second blades 300 and 302 are designed to move along the same line X, but in opposite direction, for severing a tubular as shown in FIG. 9.

Figure 10:
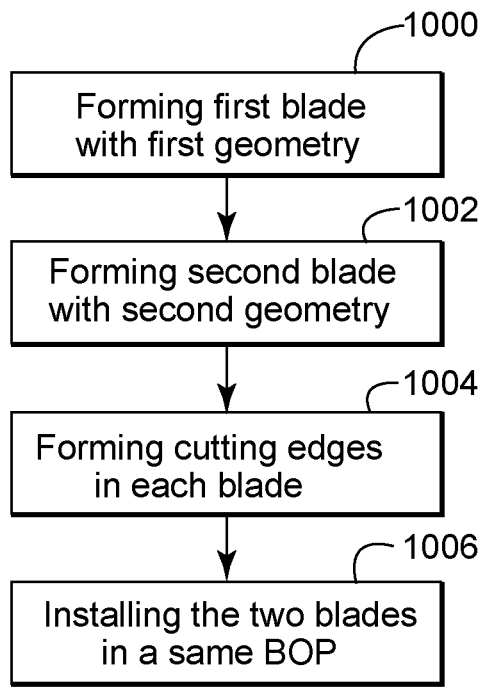
FIG. 10 is a flow chart illustrating a method for manufacturing a pair of shear blades according to an exemplary embodiment.

According to an exemplary embodiment illustrated in FIG. 10, there is a method for manufacturing a pair of shear blades for a BOP such that the shear blades have different geometries. The method includes a step 1000 of forming the first blade to have a first geometry that promotes a secure location of a tubular to be cut with the pair of blades, and a step 1002 of forming the second blade to have a second geometry, different from the first geometry, that promotes a cutting of the tubular. The shapes of the first and second blades are discussed in the previous embodiments. It is noted that shapes from different embodiments may be combined in the same pair of shear blades. The method further includes a step 1004 of forming cutting edges on both the first and second blades, and a step 1006 of installing the two blades in a same BOP for cutting the tubular.

The disclosed exemplary embodiments provide a pair of blades and a BOP that more securely shear a tool or tubular present inside the BOP. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A pair of shear blades to be provided in a ram blowout preventer for cutting a tubular, the pair of shear blades, comprising:
    a first ram shear blade having a forward end and a rearward end, a recessed cutting surface extending rearward from the forward end, the recessed cutting surface having a rearwardly curved central region, the entire recessed cutting surface having is cutting edge; and
    a second ram shear blade configured to shear the tubular in concert with the first ram shear blade, the second ram shear blade having a forward end, a rearward end, a top, a bottom, opposite side edges that are parallel to each other, each of the side edges extending from the top to the bottom and from the rearward end to the forward end, a forward extending cutting surface on the forward end of the second ram shear blade with two lateral cutting surfaces extending forward from and joining the side edges, each of the lateral cutting surfaces being in a single plane, the lateral cutting surfaces converging toward each other and intersecting at a central apex, the entire forward extending cutting surface having a cutting edge flush with a plane containing the bottom.

2. The pair of shear blades of claim 1, wherein:
    the first ram shear blade has two lateral cutting surfaces that form an acute angle with each other and join the central region; and
    the lateral cutting surfaces of the second ram shear blade converge at a different angle than the angle between the lateral cutting surfaces of the first ram shear blade.

3. The pair of shear blades of claim 1, wherein the recessed cutting surface of the first ram shear blade has a width at the forward end that is less than a width of the forward extending cutting surface of the second ram shear blade.

4. The pair of shear blades of claim 1, wherein each of the single planes of the lateral cutting surface is inclined relative to the top and the bottom.

5. The pair of shear blades of claim 1, wherein the first ram shear blade further comprises:
    top and bottom surfaces joined by opposite side edges;
    first and second non-cutting faces, each extending from one of the side edges to the recessed cutting surface; and
    the first and second non-cutting faces being located in a single common plane perpendicular to planes containing the top and bottom surfaces and parallel to the rearward end of the first ram shear blade.

6. A shear ram blowout preventer (BOP), comprising:
    a body having a first elongated cavity extending along a first axis and a second elongated cavity extending perpendicular to and intersecting the first elongated cavity;
    a pair of ram blocks provided in the first elongated cavity and configured to slide along the first axis, wherein the ram blocks have frontal faces facing each other and the frontal faces are configured to slide towards the second elongated cavity;
    a pair of shear blades configured to be attached to the ram blocks and also configured to shear a tubular provided in the second elongated cavity when the ram blocks slide towards the tubular, wherein the pair of shear blades comprises a first ram shear blade and a second ram shear blade configured to shear the tubular in concert with the first ram shear blade;
    the second ram Shear blade having a top, a bottom and opposite side edges that are parallel to each other and join the top and the bottom, a generally V-shaped cutting surface comprising a pair of cutting faces, each joining and extending forward from one of the side edges and intersecting each other at an apex equidistant between and forward of the side edges to puncture the tubular, each of the cutting faces being in a single plane and having a cutting edge flush with a plane containing the bottom; and
    the first ram shear blade having a generally V-shaped recessed cutting surface extending rearward from as forward end of the first ram shear blade to guide the tubular to a location opposite the apex, the recessed cutting surface having a cutting edge to shear the tubular, the cutting surface of the first ram shear blade having two lateral cutting faces converging toward each other rearwardly curved central cutting face, each of the lateral cutting faces being located in a single plane extending form the central cutting face to the forward end of the first ram shear blade, the cutting edge of the recessed cutting surface extending along each of the cutting faces of the cutting surface of the first ram shear blade.

7. The shear ram BOP of claim 6, wherein:
    the first ram shear blade has top and bottom surfaces joined by opposite side edges;
    the first ram shear blade has first and second forward end portions extending from the side edges of the first blade to the first and second cutting faces, respectively, of the first ram shear blade, the first and second forward end portions being non-cutting surfaces located in a single common plane that is perpendicular to planes containing the top and bottom surfaces.

8. The shear ram BOP of claim 6, wherein each of the cutting faces of the second ram shear blade is flat from one of the side edges of the second ram shear blade to the apex, and each of the cutting faces of the second ram shear blade is located in a plane that is inclined relative to the top and the bottom of the second ram shear blade.

9. The shear ram BOP of claim 6, wherein:
    the cutting faces of the first ram shear blade are at a first angle relative to each other; and
    the cutting faces of the second ram shear blade are at a second angle relative to each other, the second angle differing from the first angle.

10. The shear ram BOP of claim 6, wherein the recessed cutting surface of the first ram shear blade has a width at the forward end that is less than a width of the cutting surface of the second ram shear blade.

11. A shear ram blowout preventer (BOP), comprising:
    a body having a first elongated cavity extending along a first axis and a second elongated cavity extending perpendicular to and intersecting the first elongated cavity;
    a pair of ram blocks provided in the first elongated cavity and configured to slide along the first axis, wherein the ram blocks have frontal faces facing each other and the frontal faces are configured to slide towards the second elongated cavity;
    a pair of shear blades configured to be attached to the ram blocks and also configured to shear a tubular provided in the second elongated cavity when the ram blocks slide towards the tubular, wherein the pair of shear blades comprises a first ram shear blade and a second ram shear blade configured to shear the tubular in concert with the first ram shear blade;
    the second ram shear blade having a top, a bottom and opposite side edges that are parallel to each other and join the top and bottom, a generally V-shaped cutting surface comprising a pair of lateral cutting faces, each lateral cutting face having an outer end joining and extending forward from one of the side edges and an inner end intersecting the other cutting face at an apex equidistant between and forward of the side edges, the lateral cutting faces and the apex of the second ram shear blade having cutting edges to shear the tubular, each of the lateral cutting faces of the second ram shear blade located in a single plane the is inclined relative to the top and bottom, each of the lateral cutting faces having a cutting edge flush with a plane containing the bottom;

the first ram shear blade having a top surface, a bottom surface and opposite side edges that are parallel with each other and join the top surface and bottom surface, the first ram shear blade generally V-shaped recessed cutting surface comprising a pair of lateral cutting faces extending rearward from a forward end of the first ram shear blade and converging to a curved central cutting face, each of the lateral cutting faces of the first ram shear blade being in a single plane from the central cutting face to the forward end of the first ram shear blade, the lateral cutting faces and the central cutting face of the recessed cutting surface having cutting edges to shear the tubular; and a pair of non-cutting surfaces at the forward end of the first ram shear blade, each of the non-cutting surfaces extending from one of the lateral cutting faces of the first ram shear blade to one of side edges of the first ram shear bade, the non-cutting surfaces being located in a single plane that is perpendicular to the planes containing the top surface, the bottom surface and the side edges of the first ram shear blade.

12. The shear ram BOP of claim 11, wherein the lateral cutting faces of the second ram shear blade are at an angle relative to each other that differs from an angle between the lateral cutting faces of the first ram shear blade.

13. The shear ram BOP of claim 11, wherein the recessed cutting surface of the first ram shear blade has a width at the forward end that is less than a width of the cutting surface of the second ram shear blade.

\* \* \* \* \*